United States Patent
Zhang et al.

(10) Patent No.: US 11,363,832 B2
(45) Date of Patent: Jun. 21, 2022

(54) METHOD FOR PREPARING CORDYCEPS MILITARIS NANO-COMPOSITE POWDER WITH PROTEIN-POLYSACCHARIDE COMPLEX COACERVATION STABILITY

(71) Applicants: JIANGNAN UNIVERSITY, Jiangsu (CN); CHANGDE YANDI BIOTECHNOLOGY LIMITED COMPANY, Hunan (CN)

(72) Inventors: Min Zhang, Jiangsu (CN); Yanjun An, Jiangsu (CN); Zhongqin Li, Jiangsu (CN); Sifu Yi, Jiangsu (CN); Lihua Hou, Jiangsu (CN); Wuxiong Yang, Jiangsu (CN)

(73) Assignees: JIANGNAN UNIVERSITY, Jiangsu (CN); CHANGDE YANDI BIOTECHNOLOGY LIMITED COMPANY, Hunan (CN)

( * ) Notice: Subject to any disclaimer, the term of this patent is extended or adjusted under 35 U.S.C. 154(b) by 266 days.

(21) Appl. No.: 16/620,784

(22) PCT Filed: Jun. 27, 2018

(86) PCT No.: PCT/CN2018/093123
§ 371 (c)(1),
(2) Date: Dec. 9, 2019

(87) PCT Pub. No.: WO2019/169806
PCT Pub. Date: Sep. 12, 2019

(65) Prior Publication Data
US 2020/0138078 A1 May 7, 2020

(30) Foreign Application Priority Data
Mar. 5, 2018 (CN) .......................... 201810178533.7

(51) Int. Cl.
A23L 31/00 (2016.01)
A23P 10/47 (2016.01)
A23P 30/00 (2016.01)

(52) U.S. Cl.
CPC ............... *A23L 31/00* (2016.08); *A23P 10/47* (2016.08); *A23P 30/00* (2016.08)

(58) Field of Classification Search
USPC ....................................................... 426/443
See application file for complete search history.

(56) References Cited

FOREIGN PATENT DOCUMENTS

| CN | 107022438 A | 8/2017 |
|---|---|---|
| CN | 107183682 A | 9/2017 |

*Primary Examiner* — Lien T Tran
(74) *Attorney, Agent, or Firm* — Muncy, Geissler, Olds & Lowe, P.C.

(57) ABSTRACT

A method for preparing *Cordyceps militaris* nano-composite powder with protein-polysaccharide complex coacervation stability. The method includes sorting, drying, crushing suspending *Cordyceps militaris* ultrafine powder, emulsifying primarily, re-emulsifying, adjusting pH value and conducting spray drying. The emulsion stability after primary emulsification is not high, so re-emulsification technology is increased, and lactalbumin with higher emulsifying property and higher nutritional value are adopted as enhanced emulsifier, thus enhancing stability of an emulsifying system. The network envelopment stability of polysaccharide colloidal xanthan gum or kudzu powder is used to consolidate the stability of the emulsifying system, and a Pickering emulsifying system with multilayer of solid particle stability is constructed. The system has high stability and can effectively and organically combine fully pulverized components of *Cordyceps militaris* into microcapsule composite powder, and the powder has good dispersity and has higher degree of homogenization after being dissolved in the water.

10 Claims, No Drawings

METHOD FOR PREPARING CORDYCEPS MILITARIS NANO-COMPOSITE POWDER WITH PROTEIN-POLYSACCHARIDE COMPLEX COACERVATION STABILITY

TECHNICAL FIELD

The present invention provides a method for preparing *Cordyceps militaris* nano-composite powder with protein-polysaccharide complex coacervation stability, which belongs to the technical field of solid drink and food processing.

BACKGROUND

*Cordyceps militaris* and *C. sinensis* both belong to *Cordyceps*, and belong to Ascomycota Pyrenomycetes Sphaeriales Clavicepitaceae, known as pupae grass, North *Cordyceps sinensis* and silkworm pupa *Cordyceps*. The *Cordyceps militaris* is rich in protein, multiple trace elements, active components such as vitamin, *Cordyceps* polysaccharide, cordycepic acid, cordycepin, adenosine, superoxide dismutase (SOD), amino acid, etc., and mineral elements such as selenium, zinc, iron, etc., and has the functions of improving immunity, anti-tumor, anti-bacterium, anti-inflammation, regulating an respiratory system, sedation and hypnosis, regulating an endocrine system, lowering blood glucose, etc.

The *Cordyceps militaris* is a kind of valuable medicinal herb. The nature and flavour of the *Cordyceps militaris* are sweet, calm, and are attributive to meridians of lungs and kidney. The *Cordyceps militaris* is a valuable traditional Chinese medicine, and the drug effect thereof is similar to *C. sinensis*. The *Cordyceps militaris*, as a new food raw material, has been widely accepted. With rapidly growing demand in the market, the *Cordyceps militaris* is often developed as a substitute for traditional valuable traditional Chinese medicine—*C. sinensis*. Efficacy and indication comprise 1. tonifying kidney and tonifying Yang, tonifying essence, and treating insufficiency of kidney-yang, marrow-sea emptiness, vertigo and tinnitus, forgetfulness and insomnia, waist and knee soreness, impotence and premature ejaculation, etc; and 2. stanching and dissipating phlegm, being beneficial to lung Yin, protecting lung and tonifying kidney, securing essence and supplementing qi, and having better curative effect on the patients with lung and kidney insufficiency, chronic cough and panting and coughing sputum and blood. "National Compilation of Chinese Herbal Medicine" records: "the fruiting body and polypide of *Cordyceps militaris* (silkworm pupa *Cordyceps*) as *C. sinensis*, are also used as medicine".

Since the solid drinks are convenient, efficient, various, has special flavor and is easy to store, the solid drinks are sought and favored by more and more consumers, especially the solid drinks rich in nutrient components such as vitamin, mineral, etc., can timely supplement nutrition needed by human metabolism, and more become a good companion in many people's lives. *Cordyceps militaris*, as a substitute of *C. sinensis*, has efficacy of nourishing and health benefits, is developed as the solid drink, and has been paid attention to. At present, a number of *Cordyceps militaris* solid drinks have been successfully developed and marketed, and mainly are divided into three categories: *Cordyceps militaris* aqueous extract, as raw material, that has good water solubility, but abandons a large number of nutritive materials and has high costs, which is not a development application mode of taking full advantage of nutrition and having reasonable economy; *Cordyceps militaris* fruiting body zymolyte that has good instant solubility; and fully pulverized ultrafine powder of *Cordyceps militaris* fruiting body, wherein the aqueous solution has poor uniformity and unstable characteristic after being reconstituted due to the characteristic that the ultrafine powder is easy to cake.

The *Cordyceps militaris* solid drink prepared by adopting the technology in the present invention is different from the above three kinds. The multi-level microcapsule recombined powder is prepared by constructing Pickering emulsion using fully pulverized ultrafine nano-particle of *Cordyceps militaris* in cooperation with stable protein-polysaccharide. The recombined powder uses nano oil nano-droplets and *Cordyceps militaris* nano-particles as core materials, and uses protein and polysaccharide as composite wall materials. The *Cordyceps militaris* nano-powder is attached to a surface of oil nano-droplets, and can better maintain the dispersed state of the *Cordyceps militaris* nano-particles. The powder of finished product is a composite microcapsule particle with a good and stable structure, and has the characteristics of comprehensive nutrition, green safety, good stability, high compatibility, unique flavor, good dispersion and excellent instant solubility. A technology that functional suspended oil droplets are embedded by adopting *Cordyceps militaris* biomass ultrafine nano-powder is developed firstly.

The construction of an emulsifying system introduces functional oils into the system, which not only brings unique sensory quality, but also has important value in nutrient transmission. The addition of an emulsifier is an essential condition for emulsion preparation, however, in recent years, security issues of medium and small molecular surfactants in the traditional emulsifier have aroused consumers' concerns. The emulsifying system constructed by the present invention, without adding the surfactant, is compounded by adopting fully pulverized ultrafine nano-particle of *Cordyceps militaris*, protein colloidal particles and polysaccharide colloidal particles, which realizes the stability and uniformity of an emulsion system. No report and related products have been seen on the production of solid drinks of the emulsifying system by adopting natural biomass fully pulverized ultrafine nano-powder particles with high nutritional value, especially *Cordyceps militaris* as an emulsifying stabilizer.

Different from traditional ultrafine powder preparation technology, *Cordyceps militaris* nano-powder prepared by in the present invention adsorbs nanodroplets, then is successively embedded by the protein and polysaccharide core materials, and has the characteristic of uniform distribution. The finally prepared powder is not a single component of *Cordyceps militaris*, but is a set of organic composite powder of functional oils, *Cordyceps militaris* nano-powder, protein and polysaccharide, which not only has the additivity of the nutrition, but also solve the difficult problems of nano-powder caking, nonuniformity and poor water solubility.

Different from a traditional drying process, compared with traditional single vacuum freeze drying and spray drying, the two-stage composite drying process adopted in the present invention not only effectively enhances drying efficiency, but also significantly increases the nanocrystallization efficiency of *Cordyceps militaris*.

SUMMARY

The purpose of the present invention is to solve the problems that the *Cordyceps militaris* solid drink takes full advantage of fully pulverized ultrafine powder nutrients and taste, flavour, instant solubility of reconstituting, uniformity and stability are effectively enhanced, and to provide a construction method for stable Pickering emulsion prepared by compounding the *Cordyceps militaris* ultrafine nano-powder, protein colloidal particles and polysaccharide colloidal particles. The key of the present invention is to take full advantage of the emulsibility of the *Cordyceps militaris* ultrafine nano-powder, combine the stability of protein and polysaccharide to an emulsification system, complete the construction of microencapsules, and prepare the powder with good dispersity by adopting a spray drying device.

The fresh *Cordyceps militaris* fruiting body is dried by adopting a microwave drying device and a vacuum freeze drying device first, the low temperature pulverizing is conducted on the *Cordyceps militaris* dried fruiting body by adopting a ball mill pulverizer, then the prepared nano-ultra powder is resuspended in the aqueous phase, and the suspension is treated by ultrasonic, so that the particles are fully dispersed, oil phase is added to the suspension, and then the *Cordyceps militaris* ultrafine nano-powder is emulsified and adsorbed for the oil droplet by adopting the ultrasonic, to form a primary emulsification system, and then the protein and polysaccharide aqueous solution uniformly suspended in the aqueous phase are dropwise added step by step to the primary emulsification system, the re-emulsification treatment is conducted by the ultrasonic after the mixing is completed, the pH value is adjusted to 4.5 by citric acid, and the construction and preparation of Pickering emulsion are completed. Finally, the emulsion is dried by adopting an ultrasonic assisted spray drying method, to obtain microcapsule powder with good dispersity and solubility.

The technical solution of the present invention is:

A method for preparing *Cordyceps militaris* nano-composite powder with protein-polysaccharide complex coacervation stability, comprising sorting, drying, pulverizing, suspending *Cordyceps militaris* ultrafine powder, emulsifying primarily, re-emulsifying, adjusting pH value and conducting spray drying as follows:

(1) sorting: selecting *Cordyceps militaris* fruiting body without damage and with bright color as raw material, and quick-freezing at a temperature of −40° C. after tidying and cleaning, to obtain a *Cordyceps militaris* quick-frozen fruiting body;

(2) drying: first conducting microwave drying on the *Cordyceps militaris* quick-frozen fruiting body prepared in step (1), and then conducting vacuum freeze drying, to prepare a *Cordyceps militaris* dried fruiting body with less than 5% of wet base moisture contents, wherein the microwave power is 500 W, the microwave heating time is 10 s, the vacuum freeze drying temperature is −35° C., and the vacuum degree is less than 9 Pa;

(3) pulverizing: pulverizing the *Cordyceps militaris* dried fruiting body by a ball mill pulverizer at a temperature of 1-5° C. for more than 4 h, to obtain *Cordyceps militaris* ultrafine powder, wherein 50% of the *Cordyceps militaris* ultrafine powder has a particle size of 200 nm; and a mass ratio of the *Cordyceps militaris* dried fruiting body to zirconia spheres is 1:3 to 1:5;

(4) suspending *Cordyceps militaris* ultrafine powder: suspending the *Cordyceps militaris* ultrafine powder obtained in step (3) at a 0.1-0.2% w/v of mass volume specific gravity in a pure water, to obtain the suspension, and conducting ultrasonic treatment on the suspension by adopting ultrasonic at the power of 800 W for 10 min;

(5) emulsifying primarily: dropwise adding 2% v/v of functional fats and oils to the suspension after ultrasonic treatment in step (4) in a stirring condition, and conducting ultrasonic emulsification by adopting the ultrasonic at the power of 1000 W for 5 min, and then homogenizing through high pressure homogenizer, to prepare A liquid, wherein the homogenizing pressure condition is that a first stage pressure is 40-60 MPa, and the second stage pressure is 0-10 MPa;

(6) re-emulsifying: by mass volume ratio, suspending 0.5-1% w/v of lactalbumin and 0.02-0.05% w/v of polysaccharide colloid particles in a pure water, to prepare B liquid; then A and B liquids with a same volume were mixed by dropwise adding the B droplet to the A liquid in the stirring condition, and conducting ultrasonic emulsification by adopting an ultrasonic at the power of 1000 W for 5 min, to obtain emulsion;

(7) adjusting pH value: adding 25% w/v of citric acid to emulsion obtained by the step (6) to adjust its pH value to 4.2; and (8) spray drying: conducting spray drying on the emulsion with the adjusted pH value by adopting an ultrasonic assisted spray drying equipment, wherein a rotor speed of an atomizer in the spray drying equipment is 300.00 rpm, an inlet temperature is 180° C., an outlet temperature is 90° C., and the ultrasonic power is 500-800 W.

In step (3), the mass ratio of the *Cordyceps militaris* fruiting body to the zirconia sphere is 1:4 to 5, and the pulverizing time is 6 h.

In step (4), the *Cordyceps militaris* ultrafine powder is suspended in the pure water at the 0.15-0.2% w/v of mass volume specific gravity.

The functional fats and oils in the step (5) are tea oil or fish oil.

In the step (6), the contents of lactalbumin and polysaccharide colloid in the pure water are respectively 0.5-0.75% w/v and 0.02-0.04% w/v; and xanthan gum or kudzu powder is selected for polysaccharide colloid.

The ultrasonic power in step (8) is 700-800 W.

The present invention has the following beneficial effects that: in the present invention, Pickering emulsion stabilized by the *Cordyceps militaris* ultrafine nano-powder is formed, the lactalbumin colloidal particles and the xanthan gum colloidal particles are further adopted as an emulsifier to further stabilize the Pickering emulsion, a mixed network structure that the *Cordyceps militaris* ultrafine nano-powder and lactalbumin particles are enveloped by an xanthan gum network is formed, a multi-level microcapsule recombination system is formed so that the *Cordyceps militaris* ultrafine powder becomes a stable emulsification system, and the components are organically reconstructed into the microcapsules, which not only introduces the functional oils, improves the flavour, but also significantly improve the stability of emulsion. The two-stage composite drying process adopted in the present invention effectively enhances drying efficiency and nanocrystallization degree.

DETAILED DESCRIPTION

Specific embodiments of the present invention are described below in detail in combination with the technical solution.

Embodiment 1: A Method for Preparing Recombined Microcapsule Powder by Enveloping the Tea Oil—*Cordyceps militaris* Ultrafine Nano-Powder—Lactalbumin Particles Through a Xanthan Gum Network selecting *Cordyceps militaris* fruiting body without damage and with bright color as raw material, and quick-freezing at a temperature of −40° C. after tidying and cleaning; drying at the microwave drying power of 500 W for 10 s, and drying *Cordyceps militaris* quick-frozen fruiting body in a drying condition of 8.9 Pa and at the temperature of −35° C. by adopting a vacuum freeze drying device, to prepare a dried fruiting body with less than 5% of moisture contents; pulverizing the *Cordyceps militaris* dried fruiting body by a ball mill pulverizer at a low temperature of 1° C. for 6 h, wherein the mass ratio of the fruiting body to the zirconia sphere is 1:3; suspending the *Cordyceps militaris* ultrafine powder at a 0.15% w/v of mass volume specific gravity in a pure water, and conducting ultrasonic treatment on the suspension by adopting ultrasonic at the power of 800 W for 10 min; dropwise adding 2% v/v of tea oil to *Cordyceps militaris* ultrafine powder aqueous phase in a stirring condition, and conducting ultrasonic emulsification by adopting the ultrasonic at the power of 1000 W for 5 min, and then homogenizing through high pressure homogenizer, to prepare A liquid, wherein the homogenizing pressure condition is that a first stage pressure is 40 MPa, and a second stage pressure is 10 MPa; suspending 0.5% w/v of lactalbumin and 0.02% w/v of xanthan gum colloid particles in a pure water, to prepare B liquid, then A and B liquids with a same volume were mixed by dropwise adding the B liquid to the A liquid in the stirring condition, and conducting ultrasonic emulsification by adopting an ultrasonic at the power of 1000 W for 5 min; adding 25% w/v of citric acid to emulsion obtained by the step (6) to adjust its pH value to 4.2; and finally, conducting spray drying on the emulsion prepared finally by adopting an ultrasonic assisted spray drying equipment, wherein a rotor speed of an atomizer in the spray drying equipment is 300.00 rpm, an inlet temperature is 180° C., an outlet temperature is 90° C., and the ultrasonic power is 500 W. Compared with the stability of the aqueous phase without adding the *Cordyceps militaris* ultrafine nano-powder, the stability of the *Cordyceps militaris* solid drink prepared in the solution increases 15.4%, and saves more than 12.9% of energy consumption; and the particle size of the pulverized *Cordyceps militaris* is determined by adopting a laser particle size instrument, and the result shows that the proportion of the powder with the 100-200 nm of particle size can be enhanced to more than 16.8% by a drying process that microwave drying is combined with freeze drying.

Embodiment 2: A Method for Preparing Recombined Microcapsule Powder by Enveloping the Fish Oil—*Cordyceps militaris* Ultrafine Nano-Powder—Lactalbumin Particles Through an Kudzu Powder Network selecting *Cordyceps militaris* fruiting body without damage and with bright color as raw material, and quick-freezing at a temperature of −40° C. after tidying and cleaning; drying at the microwave drying power of 500 W for 10 s, and drying *Cordyceps militaris* quick-frozen fruiting body in a drying condition of 8.9 Pa and at the temperature of −35° C. by adopting a vacuum freeze drying device, to prepare a dried fruiting body with less than 5% of moisture contents; pulverizing the *Cordyceps militaris* dried fruiting body by a ball mill pulverizer at a low temperature of 1° C. for 6 h, wherein a mass ratio of the fruiting body to the zirconia sphere is 1:5; suspending the obtained *Cordyceps militaris* ultrafine powder at a 0.15% w/v of mass volume specific gravity in a pure water, and conducting ultrasonic treatment on the suspension by adopting ultrasonic at the power of 800 W for 10 min; dropwise adding 2% v/v of fish oil to *Cordyceps militaris* ultrafine powder aqueous phase in a stirring condition, and conducting ultrasonic emulsification by adopting the ultrasonic at the power of 1000 W for 5 min, and then homogenizing through high pressure homogenizer, to prepare A liquid, wherein the homogenizing pressure condition is that a first stage pressure is 40 MPa, and a second stage pressure is 10 MPa; suspending 0.5% w/v of lactalbumin and 0.02% w/v of kudzu powder colloid particles in a pure water, first adopting a small amount of warm water to melt kudzu powder and then adding boiling water to dissolve, finally adding lactalbumin, to prepare B liquid; then A and B liquids with a same volume were mixed by dropwise adding the B liquid to the A liquid in the stirring condition, and conducting ultrasonic emulsification by adopting an ultrasonic at the power of 1000 W for 5 min; adding 25% w/v of citric acid to emulsion obtained by the step (6) to adjust its pH value to 4.2; and finally, conducting spray drying on the emulsion prepared finally by adopting an ultrasonic assisted spray drying equipment, wherein a rotor speed of an atomizer in the spray drying equipment is 300.00 rpm, an inlet temperature is 180° C., an outlet temperature is 90° C., and the ultrasonic power is 800 W. Compared with the stability of the aqueous phase without adding the *Cordyceps militaris* ultrafine nano-powder, the stability of the *Cordyceps militaris* solid drink prepared in the solution increases 18.3%, and saves more than 10.2% of energy consumption; and the particle size of the pulverized *Cordyceps militaris* is determined by adopting a laser particle size instrument, and the result shows that the proportion of the powder with the 100-200 nm of particle size can be enhanced to more than 13.8% by a drying process that microwave drying is combined with freeze drying.

Embodiment 3: A Method for Preparing Recombined Microcapsule Powder by Enveloping the Tea Oil—*Cordyceps militaris* Ultrafine Nano-Powder—Lactalbumin Particles Through an Xanthan Gum Network selecting *Cordyceps militaris* fruiting body without damage and with bright color as raw material, and quick-freezing at a temperature of −40° C. after tidying and cleaning; drying at the microwave drying power of 500 W for 10 s, and drying *Cordyceps militaris* quick-frozen fruiting body in a drying condition of 8.9 Pa and at the temperature of −35° C. by adopting a vacuum freeze drying device, to prepare a dried fruiting body with less than 5% of moisture contents; pulverizing the *Cordyceps militaris* dried fruiting body by a ball mill pulverizer at a low temperature of 1° C. for 6 h, wherein the mass ratio of the fruiting body to the zirconia sphere is 1:5; suspending the obtained *Cordyceps militaris* ultrafine powder at a 0.2% w/v of mass volume specific gravity in a pure water, and conducting ultrasonic treatment on the suspension by adopting ultrasonic at the power of 800 W for 10 min; dropwise adding 2% v/v of tea oil to *Cordyceps militaris* ultrafine powder aqueous phase in a stirring condition, and conducting ultrasonic emulsification by adopting the ultrasonic at the power of 1000 W for 5 min, and then homogenizing through high pressure homogenizer, to prepare A liquid, wherein the homogenizing pressure condition is that a first stage pressure is 60 MPa, and a second stage pressure is 10 MPa; suspending 1% w/v of lactalbumin and 0.05% w/v of xanthan gum colloid particles in the a pure water, to prepare B liquid, then A and B liquids with a same volume were mixed by dropwise adding the B liquid to the A liquid in the stirring condition, and conducting ultrasonic emulsification by adopting an ultrasonic at the power of 1000 W for 5 min; adding 25% w/v of citric acid to emulsion obtained by the step (6) to adjust its pH value to 4.2; and finally, conducting spray drying on the emulsion prepared finally by adopting an ultrasonic assisted spray drying equipment, wherein a rotor speed of an atomizer in the spray drying equipment is 300.00 rpm, an inlet temperature is 180° C., an outlet temperature is 90° C., and the ultrasonic power is 800 W. Compared with the stability of the aqueous phase without adding the *Cordyceps militaris* ultrafine nano-powder, the stability of the *Cordyceps militaris* solid drink prepared in the solution increases 12.6%, and saves more than 8.3% of energy consumption; and the particle size of the pulverized *Cordyceps militaris* is determined by adopting a laser particle size instrument, and the result shows that the proportion of the powder with the 100-200 nm of particle size can be enhanced to more than 15.3% by a drying process that microwave drying is combined with freeze drying.

Embodiment 4: A Method for Preparing Recombined Microcapsule Powder by Enveloping the Fish Oil—*Cordyceps militaris* Ultrafine Nano-Powder—Lactalbumin Particles Through a Kudzu Powder Network selecting *Cordyceps militaris* fruiting body without damage and with bright color as raw material, and quick-freezing at the temperature of −40° C. after tidying and cleaning; drying at the microwave drying power of 500 W for 10 s, and drying *Cordyceps militaris* quick-frozen fruiting body in a drying condition of 8.9 Pa and at a temperature of −35° C. by adopting a vacuum freeze drying device, to prepare a dried fruiting body with less than 5% of moisture contents; pulverizing the *Cordyceps militaris* dried fruiting body by a ball mill pulverizer at the low temperature of 1° C. for 6 h, wherein the mass ratio of the fruiting body to the zirconia sphere is 1:5; suspending the obtained *Cordyceps militaris* ultrafine powder at a 0.2% w/v of mass volume specific gravity in a pure water, and conducting ultrasonic treatment on the suspension by adopting ultrasonic at the power of 800 W for 10 min; dropwise adding 2% v/v of tea oil to *Cordyceps militaris* ultrafine powder aqueous phase in a stirring condition, and conducting ultrasonic emulsification by adopting the ultrasonic at the power of 1000 W for 5 min, and then homogenizing through high pressure homogenizer, to prepare A liquid, wherein the homogenizing pressure condition is that a first stage pressure is 60 MPa, and a second stage pressure is 10 MPa; suspending 1% w/v of lactalbumin and 0.05% w/v of kudzu powder colloid particles in a pure water, first adopting a small amount of warm water to melt kudzu powder and then adding boiling water to dissolve, finally adding lactalbumin, to prepare B liquid; then A and B liquids with a same volume were mixed by dropwise adding the B liquid to the A liquid in the stirring condition, and conducting ultrasonic emulsification by adopting an ultrasonic at the power of 1000 W for 5 min; adding 25% w/v of citric acid to emulsion obtained by the step (6) to adjust its pH value to 4.2; and finally, conducting spray drying on the emulsion prepared finally by adopting an ultrasonic assisted spray drying equipment, wherein a rotor speed of an atomizer in the spray drying equipment is 300.00 rpm, the inlet temperature is 180° C., the outlet temperature is 90° C., and the ultrasonic power is 800 W. Compared with the stability of the aqueous phase without adding the *Cordyceps militaris* ultrafine nano-powder, the stability of the *Cordyceps militaris* solid drink prepared in the solution increases 22.8%, and saves more than 9.4% of energy consumption; and the particle size of the pulverized *Cordyceps militaris* is determined by adopting a laser particle size instrument, and the result shows that the proportion of the powder with the 100-200 nm of particle size can be enhanced to more than 11.9% by a drying process that microwave drying is combined with freeze drying.

Embodiment 5: A Method for Preparing Recombined Microcapsule Powder by Enveloping the Tea Oil—*Cordyceps militaris* Ultrafine Nano-Powder—Lactalbumin Particles Through an Xanthan Gum Network selecting *Cordyceps militaris* fruiting body without damage and with bright color as raw material, and quick-freezing at a temperature of −40° C. after tidying and cleaning; drying at the microwave drying power of 500 W for 10 s, and drying *Cordyceps militaris* quick-frozen fruiting body in a drying condition of 8.9 Pa and at the temperature of −35° C. by adopting a vacuum freeze drying device, to prepare a dried fruiting body with less than 5% of moisture contents; pulverizing the *Cordyceps militaris* dried fruiting body by a ball mill pulverizer at a low temperature of 1° C. for 6 h, wherein the mass ratio of the fruiting body to the zirconia sphere is 1:5; suspending the obtained *Cordyceps militaris* ultrafine powder at a 0.1% w/v of mass volume specific gravity in a pure water, and conducting ultrasonic treatment on the suspension by adopting ultrasonic at the power of 800 W for 10 min; dropwise adding 2% v/v of tea oil to *Cordyceps militaris* ultrafine powder aqueous phase in a stirring condition, and conducting ultrasonic emulsification by adopting the ultrasonic at the power of 1000 W for 5 min, and then homogenizing through high pressure homogenizer, to prepare A liquid, wherein the homogenizing pressure condition is that a first stage pressure is 40 MPa, and a second stage pressure is 5 MPa; suspending 1% w/v of lactalbumin and 0.05% w/v of xanthan gum colloid particles in a pure water, to prepare B liquid, then A and B liquids with a same volume were mixed by dropwise adding the B liquid to the A liquid in the stirring condition, and conducting ultrasonic emulsification by adopting an ultrasonic at the power of 1000 W for 5 min; adding 25% w/v of citric acid to emulsion obtained by the step (6) to adjust its pH value to 4.2; and finally, conducting spray drying on the emulsion prepared finally by adopting an ultrasonic assisted spray drying equipment, wherein a rotor speed of an atomizer in the spray drying equipment is 300.00 rpm, an inlet temperature is 180° C., an outlet temperature is 90° C., and the ultrasonic power is 500 W. Compared with the stability of the aqueous phase without adding the *Cordyceps militaris* ultrafine nano-powder, the stability of the *Cordyceps militaris* solid drink prepared in the solution increases 19.7%, and saves more than 15.2% of energy consumption; and the particle size of the pulverized *Cordyceps militaris* is determined by adopting a laser particle size instrument, and the result shows that the proportion of the powder with the 100-200 nm of particle size can be enhanced to more than 11.9%25 by a drying process that microwave drying is combined with freeze drying.

Embodiment 6: A Method for Preparing Recombined Microcapsule Powder by Enveloping the Fish Oil—*Cordyceps militaris* Ultrafine Nano-Powder—Lactalbumin Particles Through an Kudzu Powder Network selecting *Cordyceps militaris* fruiting body without damage and with bright color as raw material, and quick-freezing at a temperature of −40° C. after tidying and cleaning; drying at the microwave drying power of 500 W for 10 s, and drying *Cordyceps militaris* quick-frozen fruiting body in a drying condition of 8.9 Pa and at the temperature of −35° C. by adopting a vacuum freeze drying device, to prepare a dried fruiting body with less than 5% of moisture contents; pulverizing the *Cordyceps militaris* dried fruiting body by a ball mill pulverizer at a low temperature of 1° C. for 6 h, wherein the mass ratio of the fruiting body to the zirconia sphere is 1:5; suspending the obtained *Cordyceps militaris* ultrafine powder at a 0.1% w/v of mass volume specific gravity in a pure water, and conducting ultrasonic treatment on the suspension by adopting ultrasonic at the power of 800 W for 10 min; dropwise adding 2% v/v of tea oil to *Cordyceps militaris* ultrafine powder aqueous phase in a stirring condition, and conducting ultrasonic emulsification by adopting the ultrasonic at the power of 1000 W for 5 min, and then homogenizing through high pressure homogenizer, to prepare A liquid, wherein the homogenizing pressure condition is that a first stage pressure is 40 MPa, and a second stage pressure is 5 MPa; suspending 0.75% w/v of lactalbumin and 0.035% w/v of kudzu powder colloid particles in a pure water, first adopting a small amount of warm water to melt kudzu powder and then adding boiling water to dissolve, finally adding lactalbumin, to prepare B liquid; then A and B liquids with a same volume were mixed by dropwise adding the B liquid to the A liquid in the stirring condition, and conducting ultrasonic emulsification by adopting an ultrasonic at the power of 1000 W for 5 min; adding 25% w/v of citric acid to emulsion obtained by the step (6) to adjust its pH value to 4.2; and finally, conducting spray drying on the emulsion prepared finally by adopting an ultrasonic assisted spray drying equipment, wherein a rotor speed of an atomizer in the spray drying equipment is 300.00 rpm, an inlet temperature is 180° C., an outlet temperature is 90° C., and the ultrasonic power is 800 W. Compared with the stability of the aqueous phase without adding the *Cordyceps militaris* ultrafine nano-powder, the stability of the *Cordyceps militaris* solid drink prepared in the solution increases 16.5%, and saves more than 10.6% of energy consumption; and the particle size of the pulverized *Cordyceps militaris* is determined by adopting a laser particle size instrument, and the result shows that the proportion of the powder with the 100-200 nm of particle size can be enhanced to more than 12.8% by a drying process that microwave drying is combined with freeze drying.

The invention claimed is:

1. A method for preparing *Cordyceps militaris* nano-composite powder with protein-polysaccharide complex coacervation stability, comprising sorting, drying, pulverizing, suspending *Cordyceps militaris* ultrafine powder, emulsifying primarily, re-emulsifying, adjusting pH value and conducting spray drying as follows:
    (1) sorting: selecting *Cordyceps militaris* fruiting body without damage and with bright color as raw material, and quick-freezing at a temperature of −40° C. after tidying and cleaning, to obtain a *Cordyceps militaris* quick-frozen fruiting body;
    (2) drying: first conducting microwave drying on the *Cordyceps militaris* quick-frozen fruiting body prepared in step (1), and then conducting vacuum freeze drying, to prepare a *Cordyceps militaris* dried fruiting body with less than 5% of wet base moisture contents, wherein the microwave power is 500 W, the microwave heating time is 10 s, the vacuum freeze drying temperature is −35° C., and the vacuum degree is less than 9 Pa;
    (3) pulverizing: pulverizing the *Cordyceps militaris* dried fruiting body by a ball mill pulverizer at a temperature of 1-5° C. for more than 4 h, to obtain the *Cordyceps militaris* ultrafine powder, wherein zirconia sphere is equipped in the ball mill pulverizer, wherein 50% of the *Cordyceps militaris* ultrafine powder has a particle size of 200 nm; and a mass ratio of the *Cordyceps militaris* dried fruiting body to zirconia spheres is 1:3 to 1:5;
    (4) suspending the *Cordyceps militaris* ultrafine powder: suspending the *Cordyceps militaris* ultrafine powder obtained in step (3) at 0.1-0.2% w/v of mass volume specific gravity in pure water, to obtain the suspension, and conducting ultrasonic treatment on the suspension by adopting ultrasonic at the power of 800 W for 10 min;
    (5) emulsifying primarily: dropwise adding 2% v/v of functional oils to the suspension after ultrasonic treatment in step (4) in a stirring condition, and conducting ultrasonic emulsification by adopting the ultrasonic at the power of 1000 W for 5 min, and then homogenizing through high pressure homogenizer, to prepare A liquid, wherein the homogenizing pressure condition is that a first stage pressure is 40-60 MPa, and a second stage pressure is 0-10 MPa;
    (6) re-emulsifying: by mass volume ratio, suspending 0.5-1% w/v of lactalbumin and 0.02-0.05% w/v of polysaccharide colloidal particles in pure water, to prepare B liquid; then A and B liquids with a same volume are mixed by dropwise adding the B droplet to the A liquid in the stirring condition, and conducting ultrasonic emulsification by adopting a ultrasonic at the power of 1000 W for 5 min, to obtain emulsion;
    (7) adjusting pH value: adding 25% w/v of citric acid to the emulsion obtained at the step (6) to adjust pH value to 4.2;
    (8) spray drying: conducting spray drying on the emulsion with the adjusted pH value by adopting an ultrasonic assisted spray drying equipment, wherein a rotor speed of an atomizer in the spray drying equipment is 300.00 rpm, an inlet temperature is 180° C., an outlet temperature is 90° C., and an ultrasonic power is 500-800 W.

2. The method for preparing *Cordyceps militaris* nano-composite powder according to claim 1, wherein in step (3), the mass ratio of the *Cordyceps militaris* fruiting body to the zirconia sphere is 1:4 to 5, and the pulverizing time is 6 h.

3. The method for preparing *Cordyceps militaris* nano-composite powder according to claim 1, wherein in step (4), the *Cordyceps militaris* ultrafine powder is suspended in pure water at the 0.15-0.2% w/v of mass volume specific gravity.

4. The method for preparing *Cordyceps militaris* nano-composite powder according to claim 1, wherein the functional oils in step (5) are tea oil or fish oil.

5. The method for preparing *Cordyceps militaris* nano-composite powder according to claim 3, wherein the functional oils in the step (5) are tea oil or fish oil.

6. The method for preparing *Cordyceps militaris* nano-composite powder according to claim 1, wherein in step (6), the contents of lactalbumin and polysaccharide colloid in pure water are respectively 0.5-0.75% w/v and 0.02-0.04% w/v; and xanthan gum or kudzu powder is selected for polysaccharide colloid.

7. The method for preparing *Cordyceps militaris* nano-composite powder according to claim 3, wherein in the step (6), the contents of lactalbumin and polysaccharide colloid in pure water are respectively 0.5-0.75% w/v and 0.02-

0.04% w/v; and the xanthan gum or the kudzu powder is selected for polysaccharide colloid.

8. The method for preparing *Cordyceps militaris* nanocomposite powder according to claim 4, wherein in the step (6), the contents of lactalbumin and polysaccharide colloid in pure water are respectively 0.5-0.75% w/v and 0.02-0.04% w/v; and the xanthan gum or the kudzu powder is selected for polysaccharide colloid.

9. The method for preparing *Cordyceps militaris* nanocomposite powder with protein-polysaccharide complex coacervation stability according to claim 1, wherein the ultrasonic power in step (8) is 700-800 W.

10. The method for preparing *Cordyceps militaris* nanocomposite powder with protein-polysaccharide complex coacervation stability according to claim 6, wherein the ultrasonic power in step (8) is 700-800 W.

* * * * *